United States Patent Office 2,989,459
Patented June 20, 1961

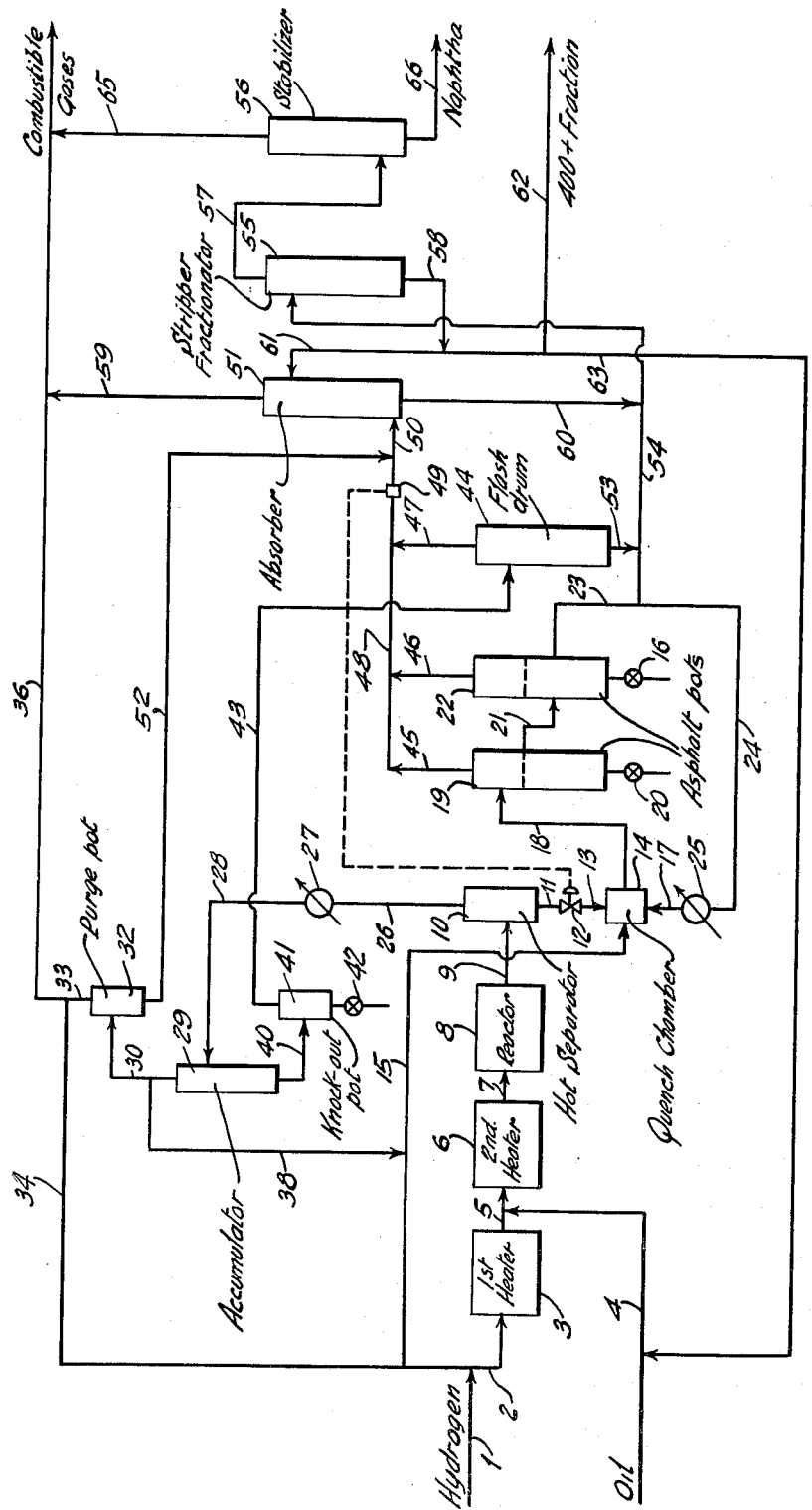

2,989,459
HYDROCONVERSION OF HYDROCARBONS WITH SEPARATION OF PRODUCTS
Du Bois Eastman, Whittier, and Warren G. Schlinger, Pasadena, Calif., assignors to Texaco Inc., a corporation of Delaware
Filed June 5, 1958, Ser. No. 740,059
5 Claims. (Cl. 208—102)

This invention relates to the hydroconversion of hydrocarbons. More particularly, it relates to the apolymeric hydroconversion of a hydrocarbon oil by contacting the oil with hydrogen under conditions of turbulent flow and at temperatures and pressures sufficient to convert at least a portion of the oil into more valuable products.

In the hydroconversion processes of the prior art the yields of desirable lighter products have been unsatisfactory whereas the yields of undesirable products such as high polymers and coke have been uneconomically high. In conventional hydroconversion of hydrocarbon oils larger hydrocarbon molecules are cracked into smaller active fragments with which the hydrogen theoretically should react. Actually, however, the hydrogen does not reach many of these active fragments which, as a result, inter-react to form high polymers at the expense of the yield of the desired lighter products.

One of the features of the process of the present invention is that the hydroconversion is effected without the formation of high polymers or, in other words, the hydroconversion is apolymeric.

Any hydrocarbon oil may be treated satisfactorily by the process of the present invention. Such materials as vacuum residuum, reduced crude, straight run gas oil, thermally cracked gas oil, FC cycle gas oil, whole crude, shale oil and tar sand oil may be advantageously converted into valuable products such as heating gas and motor fuels. The conversion is effected under conditions of turbulent flow at temperatures between 800 and 1500° F., preferably between about 900 and 1100° F. Superatmospheric pressures ranging from 500 to 20,000 p.s.i.g. may be employed. Satisfactory results have been obtained using pressures of 1000 to 10,000 p.s.i.g. Recycle gas rates of at least 1000 cubic feet per barrel of feed may be employed, although rates of 2000 to 100,000 cubic feet per barrel of feed are preferred. It is desirable for the recycle gas to have a high hydrogen concentration but hydrogen concentrations as low as 25 volume percent may be employed. Residence times of from 5 seconds to 2 minutes or longer may be used. Preferably, the residence time ranges from about 10 to about 60 seconds.

In our copending application, Serial No. 577,027, filed April 9, 1956, now abandoned, of which this application is a continuation-in-part, there is described a method for the conversion of hydrocarbon oils by contacting the oil with hydrogen under conditions of turbulent flow.

In the described method, it is disclosed that oil feed rate, hydrogen recycle rate, reaction coil diameter, and operating conditions of temperature and pressure all tend to affect velocity of flow and turbulence. It was found convenient to express turbulence in terms of the ratio of the average apparent viscosity of the flowing stream, $\bar{\epsilon}_m$, to the molecular or kinematic viscosity $\nu$, vis., $\bar{\epsilon}_m/\nu$, and to refer to this ratio, $\bar{\epsilon}_m/\nu$, as turbulence level. The apparent viscosity of the flowing stream $\epsilon_m$, equals the sum of the eddy viscosity, $\epsilon_m$, and the kinematic viscosity $\nu$ which may be shown by the expression $$\epsilon_m = \epsilon_m + \nu$$

Under conditions of turbulence, $\epsilon_m$ has a finite value and it is apparent that if the magnitude of the apparent viscosity exceeds the kinematic viscosity at the point in question the ratio of $\epsilon_m/\nu$ exceeds unity. For a given turbulent system, it follows that the average value of the ratio, as expressed by $\bar{\epsilon}_m/\nu$ exceeds unity. The average apparent viscosity, $\bar{\epsilon}_m$ as employed herein is defined by the equation $$\bar{\epsilon}_m = \frac{1}{r_0}\int_0^{r_0} \epsilon_m dr$$

where $r_0$ is the radius of the conduit. By substitution and integration, employing the parameters described by Corcoran et al., in Industrial and Engineering Chemistry, volume 44, page 410 (1952), this expression $$\bar{\epsilon}_m = \frac{1}{r_0}\int_0^{r_0} \epsilon_m dr$$

may be rewritten $$\bar{\epsilon}_m = \frac{r_0}{15}\sqrt{\frac{r_0 g}{2\sigma}\frac{dp}{dx}}$$

The latter equation is in terms which may be readily determined for a given system. In the foregoing, $d$ represents differential; $g$ represents acceleration of gravity, feet per second$^2$; $p$ represents pressure, pounds per square foot; $r_0$ represents radius of conduit in feet; $x$ represents distance, feet; $\epsilon_m$ represents eddy viscosity, square feet per second; $\epsilon_m$ represents apparent viscosity, square feet per second; $\bar{\epsilon}_m$ represents average appparent viscosity, square feet per second; $\nu$ represents kinematic viscosity, square feet per second; and $\sigma$ represents specific weight, pounds per cubic foot. Turbulence levels above 25 may be employed but turbulence levels of 50 to 1000 are preferable.

In the above described process the oil feed is intimately mixed with the hydrogenating gas and the intimate mixture of hydrogen and oil enables the hydrogen to reach quickly the active centers formed by cracking and to effect the hydrogenation of these centers smoothly by reducing the length of the diffusion distance and thereby suppressing the formation of polymers. When lighter oils are used as the feed stock the oil may be in the vapor state under reaction conditions. When the feed stock is a heavy oil in some cases it or a portion thereof remains liquid under reaction conditions and consequently in this latter instance two phases are present in the reaction zone.

When two phases flow through the same conduit it is possible to have several types of flow. These various types are stratified flow, wave flow, plug flow, slug flow, annular flow, bubble or froth flow and dispersed or spray flow and are described by Baker in the Oil and Gas Journal, July 26, 1954, page 185, et seq. Of the different types of two-phase flow only the bubble or froth type or the dispersed or spray type are satisfactory for the process of the present invention and in the present specification and appended claims the term "intimate mixture" is intended to exclude two-phase flows of the stratified, wave, plug, slug, and annular type.

Although the process operates in a satisfactory manner, it has been found that during the operation small amounts of asphalt in finely divided form which are present in the system tend to agglomerate and some difficulty has been encountered in recovering the desired products due to the presence of these agglomerates which tend to plug the lines and separators in the product recovery section of the apparatus.

It has now been found that plugging of the apparatus can be prevented by quenching the liquid portion of the reactor effluent to precipitate the asphalt in the form of particles which are easily separated from the liquid and which can be removed from the system thereby avoiding plugging of the apparatus by the agglomerates.

When the asphalt, which is liquid at reaction temperatures, is allowed to cool gradually during the normal processing of the reaction products, it separates in the form of fine particles which agglomerated and tend to plug the lines, coolers, separators and other apparatus of the recovery system. However, when the liquid material separated from the hot reaction products is rapidly cooled or quenched the asphaltic material is precipitated in the form of particles having a size of approximately 10 mesh. This precipitated material can be readily removed from the liquid stream.

Precipitation of the asphalt in easily-removable form is effected by rapidly cooling or quenching the liquid material separated from the reactor effluent from reaction temperature to a temperature below 500° F. and preferably below 450° F. The quenching is advantageously accomplished in a few seconds, preferably, not more than one second. One method of effecting the quenching is to contact the liquid material with cooled oil from which the precipitated asphalt has been removed. Another satisfactory method for quenching the liquid material is to inject a cooled gas into the hot stream. Suitable gases are those recovered from the gaseous portion of the reaction product and which may contain substantial amounts of lower hydrocarbons or gases which are substantially free of lower hydrocarbons, such as recycle hydrogenation gas.

In the process of the invention, the effluent from the conversion zone is introduced into a separator which is maintained at reaction temperature and pressure. To facilitate the separation the effluent is introduced tangentially into the separator. No liquid level is maintained in the separator, a portion of the effluent gases being withdrawn from the hot separator through its upper outlet and the balance of the gases leaving the hot separator with the liquid portion of the effluent through the lower outlet which leads to a pressure letdown valve. The amount of the gases leaving the hot separator with the liquid portion of the effluent is regulated by controlling the pressure letdown valve. Release, with the liquid, of about 10% of the total gas leaving the conversion zone gives satisfactory operation. However, the amount of gas released with the liquid from the hot separator is not fixed and can be varied to some extent without adversely effecting the operation. Hydrocarbons present in the overhead from the hot separator are recovered and sent to the product recovery section. Hydrogen present in the hot separator overhead is recycled to the conversion zone.

As the liquid-gas portion of the reactor effluent leaves the hot separator it passes through the pressure letdown valve where it is subjected to a reduction in pressure from reaction pressure to a pressue below about 300 p.s.i.g. The quenching then takes place as close as possible to the letdown valve before the hydrogen release causes any asphalt to solidify. Preferably the quenching is effected by introducing the quenching medium through a small pipe within the drawoff line from the letdown valve. The quenched material passes through the annulus surrounding the pipe through which the quenched medium is introduced and is transferred to an asphalt pot into which it is introduced above the liquid level to disengage gas. In the asphalt pot the asphalt, which is now in the form of particles of 8–10 mesh size, settles to the bottom and is removed through a lock hopper. The liquid overflows into a second asphalt pot into which it is introduced below the liquid level thereof to wet any asphalt still remaining in the liquid and help it to settle. The settled asphalt is withdrawn from the second pot through a lock hopper and the asphalt-free liquid is sent to the product recovery section.

The invention may be more easily understood by reference to the accompanying drawing which represents diagrammatically a flow scheme for the practice of the invention.

Hydrogen from any suitable source, such as electrolytic hydrogen, hydrogen produced in the catalytic reforming of a petroleum naphtha fraction or by the partial combustion of a hydrocarbonaceous material is introduced through lines 1 and 2 into primary heater 3 where it is heated to a temperature of approximately 800 to 850° F. The preheated hydrogen is withdrawn through line 5 and together with oil from line 4 is passed to secondary heater 6 where the mixture of hydrogen and oil is heated to reaction temperature. The heated mixture is introduced through lne 7 into reactor 8 where it is subjected under conditions of turbulent flow to the desired condition of temperature and pressure and the product is then withdrawn through line 9 to hot separator 10 into which it is introduced tangentially. Hot separator 10 is maintained at substantially the same operating conditions as reactor 8. By introducing the effluent tangentially into hot separator 10 the separation of liquid from gaseous material is facilitated. Liquid material together with some gaseous material is withdrawn from hot separator 10 through line 11 and passes through letdown valve 12 where the pressure is reduced from reaction pressure to about 150–300 p.s.i.g. From letdown valve 12 the mixture passes through line 13 to quench chamber 14 where it is contacted with cooled gas from line 15 or recycle oil from line 17 and quenched to a temperature below about 400–500° F. A quench pipe, not shown, connecting lines 17 and 15 extends through quench chamber 14 into the outlet of line 13. Letdown valve 12 is regulated to control the amount of gaseous material passing from hot separator 10 to quench chamber 14, as will be described more fully below. The quenched material then passes through line 18 to the upper portion of asphalt pot 19 above the liquid level thereof. In asphalt pot 19 the asphalt settles and is removed from the system through lock hopper 20. Asphalt pot 19 is maintained at a temperature of approximately 100–200° F. and a pressure of about 150–300 p.s.i.g. Liquid from asphalt pot 19 together with any unsettled asphalt passes through overflow line 21 to asphalt pot 22 into which it is introduced below the liquid level. Asphalt pot 22 is maintained at a temperature of 100–150° F. and a pressure of 150–300 p.s.i.g. Any asphalt which remains in the supernatant liquid in asphalt pot 19 and which is carried over to asphalt pot 22 is allowed to settle and is removed through lock hopper 16. Liquid from asphalt pot 22 is removed through line 23 and a portion thereof may be recycled through line 24, cooler 25 and line 17 to quench zone 14.

Gaseous material is removed from hot separator 10 through line 26, cooler 27 and line 28 to accumulator 29 which serves as a separator. Accumulator 29 is maintained at a temperature of 100–200° F. and a pressure of 2000–10,000 p.s.i.g. Gases separated in accumulator 29 are withdrawn through line 30 and a portion thereof is transferred to purge pot 32 where a separation of recycle gases including hydrogen from carryover hydrocarbon liquid is made. Another portion of the gases separated in accumulator 29 may be diverted to quench chamber 14, through lines 30, 38 and 15, to serve as a quenching medium. Hydrogen is withdrawn from purge pot 32 through line 33 where a portion to be used for recycle is returned to primary heater 3 through lines 34 and 2. If hydrogen from purge pot 32 is to be used as a quench medium, it is sent to quench chamber 14 through lines 33, 34 and 15. Excess hydrogen is sent to the flare or external storage through line 36.

Liquid from accumulator 29 is withdrawn through line 40 to knock out pot 41 for the removal of any entrained solid material which is withdrawn through lock hopper 42. The liquid passes from knock out pot 41 through line 43 to flash drum 44 which is maintained at a temperature of about 100° F. and a pressure of about 150–300 p.s.i.g.

Vaporous and gaseous hydrocarbons withdrawn from asphalt pots 19 and 22 and flash drum 44 through lines 45, 46 and 47 respectively are combined in line 48 and pass through flow metering system 49 and line 50 into absorber 51. Flow metering system 49 is connected to letdown valve 12 to control the amount of gas passing with the liquid through letdown valve 12. The amount of gas passing through letdown valve 12 should not exceed the amount of gas production plus excess hydrogen.

Entrained hydrocarbons separated in purge pot 32 are withdrawn through line 52 and combined, in line 50, with those recovered from asphalt pots 20 and 22 and flush drum 44 and the combined stream introduced into absorber 51. The liquid residue from flash drum 44 is withdrawn through line 53 and combined with liquid material, withdrawn through line 23 from asphalt pot 22, in line 54 through which the combined stream is passed to stripper fractionator 55. In stripper fractionator 55 the stream is separated into a gaseous fraction, containing 400° F. end point naphtha, removed through line 57 and a fraction boiling above 400° F. which is directed through lines 58 and 61 to absorber 51 where it contacts in countercurrent flow the gaseous material introduced into absorber 51 through line 50. The countercurrent contacting effects separation of the $C_3$ and lighter hydrocarbons from the $C_4$ and heavier hydrocarbons and the former are removed from the system through lines 59 and 36 while the enriched stream containing the latter is withdrawn through line 60 and returned to stripper fractionator 55 through line 54. The naphtha-containing fraction withdrawn from stripper fractionator 55 through line 57 is introduced into stabilizer 56 wherein the light hydrocarbons are separated and removed through lines 65 and 36 and the stabilized naphtha fraction is removed through line 66. Excess liquid boiling above the motor fuel range may be withdrawn from the system by means of lines 58, 61 and 62 or may be recycled to secondary heater 6 through lines 58, 63, 4 and 5.

When the hydrogen used in the process is derived from the partial combustion of a hydrocarbonaceous material a suitable feed for the partial combustion process is the asphalt removed through lock hoppers 20 and 16. Oil from line 62 is also a suitable feed for the partial combustion process. Mixtures of hydrogen and carbon monoxide obtained by the partial combustion of hydrocarbonaceous materials are suitable for use as the hydrogenating gas in the process of the invention.

The following example is given for illustrative purposes only.

*Example*

In this example comparative runs A and B were made. In each run, the feed stock was a low API gravity heavy oil having a high sulfur content and a high Conradson carbon residue. In run A, the oil was reacted at 8300 p.s.i.g. and 959° F. A gas containing 85 mol percent hydrogen was recycled at a rate of 41,300 cubic feet per barrel of feed. Turbulent flow conditions were maintained such that the turbulence level expressed by ratio $\bar{e}_m/\nu$, was 192.

The hydrogenation product was separated into three fractions distributed in the following proportions:

| | Weight percent total feed |
|---|---|
| Dry gas | 20.4 |
| Motor fuel ($C_4$—400° F.) | 44.5 |
| 400° F. + | 35.1 |

The ASTM Research Octane Numbers for the motor fuel fraction were 80.9 clear and 88.5 leaded (containing 3 ml. TEL/gallon).

Run A was terminated involuntarily because of the plugging of a valve.

The only material difference between run A and run B was that in the latter, the liquid portion of the reactor effluent was quenched from reaction temperature to about 300° F. by being mixed with cool recycle oil from which the asphalt had been removed. The quenched mixture was then introduced into a first asphalt pot above the liquid level thereof and the overflow from the first pot was introduced into a second asphalt pot below the liquid level thereof. A portion of the liquid flowing from the second asphalt pot was cooled and returned to the quench chamber. Asphalt which settled in the asphalt pots were removed through a lock hopper.

The motor fuel fraction recovered from run B, and which amounted to 46.52% by volume of the feed, had ASTM Research Octane Numbers of 72.2 clear and 87.3 leaded.

Asphalt removed from the asphalt pots amounted to 0.51 weight percent basis feed.

The duration of run B, which was terminated by the breaking of a compressor shaft was more than 14 times that of run A.

Obviously many modifications and variations of the invention, as hereinbefore set forth, may be made without departing from the spirit and scope thereof, and therefore only such limitations should be imposed as are indicated in the appended claims.

We claim:

1. A process for the hydroconversion of an asphalt containing hydrocarbon oil which comprises forming an intimate mixture of said oil with a hydrogen-containing gas, passing said mixture as a confined stream through an elongated reaction zone at a turbulence level of at least 25, at a temperature between 800 and 1500° F. and a pressure between about 500 and 20,000 p.s.i.g., said hydroconversion being accompanied by the consumption of hydrogen, introducing the hydroconversion effluent into a first separation zone maintained at substantially the same temperature and pressure as the reaction zone, separating the effluent in said first separation zone into a first portion consisting essentially of gaseous material and a second portion containing substantially all of the liquid hydroconversion product present and a minor amount of gaseous material including hydrogen, quenching said second portion to precipitate solid material therefrom, passing said quenched portion together with the precipitated solid material to a second separation zone and separating the precipitated solid material from the liquid hydroconversion product.

2. The process of claim 1 in which the turbulence level is between about 50 and 1000.

3. The process of claim 1 in which said first portion contains about 90% of the gaseous material present.

4. A process for the hydroconversion of an asphalt containing hydrocarbon oil which comprises forming an intimate mixture of said oil with a hydrogen containing gas, passing said mixture as a confined stream through an elongated reaction zone at a turbulence level of at least 25, at a temperature between 800 and 1500° F. and a pressure between about 500 and 20,000 p.s.i.g., said hydroconversion being accompanied by the consumption of hydrogen, introducing the effluent into a first separation zone maintained at substantially the same temperature and pressure as the reaction zone, separating the effluent in said first separation zone into a first portion consisting essentially of gaseous material and a second portion containing substantially all of the liquid hydroconversion product present and a minor amount of gaseous material including hydrogen, quenching said second portion to precipitate solid material therefrom, passing said quenched portion together with precipitated solid material to a second separation zone, maintaining a liquid level in said second separation zone, introducing said second portion together with precipitated solid material into said second separation zone at a point spaced above the liquid level thereof, allowing precipitated solid material to settle in said second separation zone, withdrawing settled solid material from said second separation zone and separately withdrawing liquid material of reduced solid content from said second separation zone, passing said withdrawn liquid material of reduced solid content to a third separation zone, maintaining a liquid level in said third separation zone, introducing said withdrawn liquid material of reduced solid content into said third separation zone at a point below the liquid level thereof, withdrawing from said third separation zone a liquid portion substantially free of solid material, cooling said first portion removed from said first separation zone and separating said first portion into normally gaseous material and normally liquid material, combining said normally liquid material with the liquid portion substantially free of solid material withdrawn from said third separation zone to produce a first combined stream, separating from said second and third separation zones streams of gaseous material, combining said streams of gaseous material to form a second combined stream, passing said first combined stream in countercurrent flow with said second combined stream whereby normally liquid hydrocarbons are absorbed from said second combined stream by said first combined stream and returning at least a portion of said second combined stream to the hydroconversion zone.

5. The process of claim 4 in which the effluent from the hydroconversion zone is introduced tangentially into said first separation zone.

References Cited in the file of this patent

UNITED STATES PATENTS

| | | |
|---|---|---|
| 1,888,998 | Mercier | Nov. 29, 1932 |
| 1,961,982 | Pier | June 5, 1934 |
| 2,007,226 | Szayna | July 9, 1935 |
| 2,020,653 | Morgan | Nov. 12, 1935 |
| 2,065,201 | Szayna | Dec. 22, 1936 |
| 2,135,014 | Ostergaard | Nov. 1, 1938 |
| 2,189,016 | Miller et al. | Feb. 6, 1940 |
| 2,207,494 | Viktora | July 9, 1940 |
| 2,240,433 | Atwell | Apr. 29, 1941 |
| 2,381,522 | Stewart | Aug. 7, 1945 |